(12) United States Patent
Mettu et al.

(10) Patent No.: US 9,959,309 B2
(45) Date of Patent: May 1, 2018

(54) DISTRIBUTED RESERVATION SYSTEMS AND METHODS

(71) Applicant: Tenoware R&D Limited, Dublin (IE)

(72) Inventors: Pavan K. Mettu, Mountain View, CA (US); Avinash Kumar, Sunnyvale, CA (US)

(73) Assignee: TENOWARE R&D LIMITED (IE)

( * ) Notice: Subject to any disclaimer, the term of this patent is extended or adjusted under 35 U.S.C. 154(b) by 473 days.

(21) Appl. No.: 14/532,850

(22) Filed: Nov. 4, 2014

(65) Prior Publication Data

US 2015/0127917 A1 May 7, 2015

Related U.S. Application Data

(60) Provisional application No. 61/899,767, filed on Nov. 4, 2013.

(51) Int. Cl.
| | |
|---|---|
| *G06F 17/00* | (2006.01) |
| *G06F 17/30* | (2006.01) |
| *G06F 9/52* | (2006.01) |
| *G06F 12/14* | (2006.01) |
| *G06F 3/06* | (2006.01) |

(52) U.S. Cl.
CPC ........ *G06F 17/30362* (2013.01); *G06F 3/062* (2013.01); *G06F 3/067* (2013.01); *G06F 3/0637* (2013.01); *G06F 9/526* (2013.01); *G06F 12/1475* (2013.01)

(58) Field of Classification Search
None
See application file for complete search history.

(56) References Cited

U.S. PATENT DOCUMENTS

| | | | | |
|---|---|---|---|---|
| 6,393,539 | B1* | 5/2002 | Nguyen | G06F 12/1466 709/217 |
| 8,001,580 | B1* | 8/2011 | Hyer, Jr. | G06F 17/30171 726/2 |
| 2003/0188218 | A1 | 10/2003 | Lubbers et al. | |
| 2005/0086237 | A1* | 4/2005 | Monnie | G06F 9/544 |
| 2005/0160137 | A1* | 7/2005 | Ishikawa | G06F 12/0897 709/203 |

(Continued)

FOREIGN PATENT DOCUMENTS

EP    2176756 A2    4/2010

OTHER PUBLICATIONS

"Information technology—SCSI Primary Commands -3 (SPC-3)", Internet Citation, May 4, 2005, XP002402999, URL: http://13thmonkey.org/documentation/SCSI/spc3r23.pdf [retrieved on Oct. 13, 2006], whole document.

*Primary Examiner* — David Yi
*Assistant Examiner* — Craig S Goldschmidt
(74) *Attorney, Agent, or Firm* — Steven R. Sponseller; Stevens Law Group

(57) ABSTRACT

Example distributed reservation systems and methods are described. In one implementation, multiple storage nodes are configured to store distributed data. Multiple clients are coupled to the multiple storage nodes and access data from the multiple storage nodes. A management server is coupled to the multiple storage nodes and the multiple clients. The management server manages the access of data by the multiple clients and manages reservation of the multiple storage nodes by a particular client.

10 Claims, 5 Drawing Sheets

(56) References Cited

U.S. PATENT DOCUMENTS

| | | | |
|---|---|---|---|
| 2007/0071234 A1* | 3/2007 | Lagrange | H04N 7/1675 380/28 |
| 2008/0082647 A1* | 4/2008 | Baker | G06F 9/505 709/223 |
| 2011/0173506 A1 | 7/2011 | Allen et al. | |
| 2012/0102561 A1 | 4/2012 | Butt | |
| 2012/0151095 A1 | 6/2012 | Cyr et al. | |
| 2012/0254342 A1* | 10/2012 | Evans | G06F 11/186 709/214 |

* cited by examiner

DISTRIBUTED RESERVATION SYSTEMS AND METHODS

CROSS-REFERENCE TO RELATED APPLICATIONS

This application claims the benefit of U.S. Provisional Application Ser. No. 61/899,767, entitled "Distributed Reservations," filed Nov. 4, 2013, the disclosure of which is incorporated herein by reference in its entirety.

TECHNICAL FIELD

The present disclosure relates to distributed reservation systems and methods that support access to shared storage devices.

BACKGROUND

Data processing systems use various techniques to allow multiple devices to access blocks of data storage at the same time. Many existing systems include a single storage server with multiple storage disks attached to the storage server. In these systems, all clients are connected to a single point (e.g., the storage server) and access data through that single point. However, some systems utilize an architecture that includes multiple storage nodes such that data is distributed across the multiple storage nodes. In these systems, multiple clients access the data from the multiple storage nodes. This architecture needs an improved reservation system that allows the multiple clients to access data on the multiple storage nodes.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
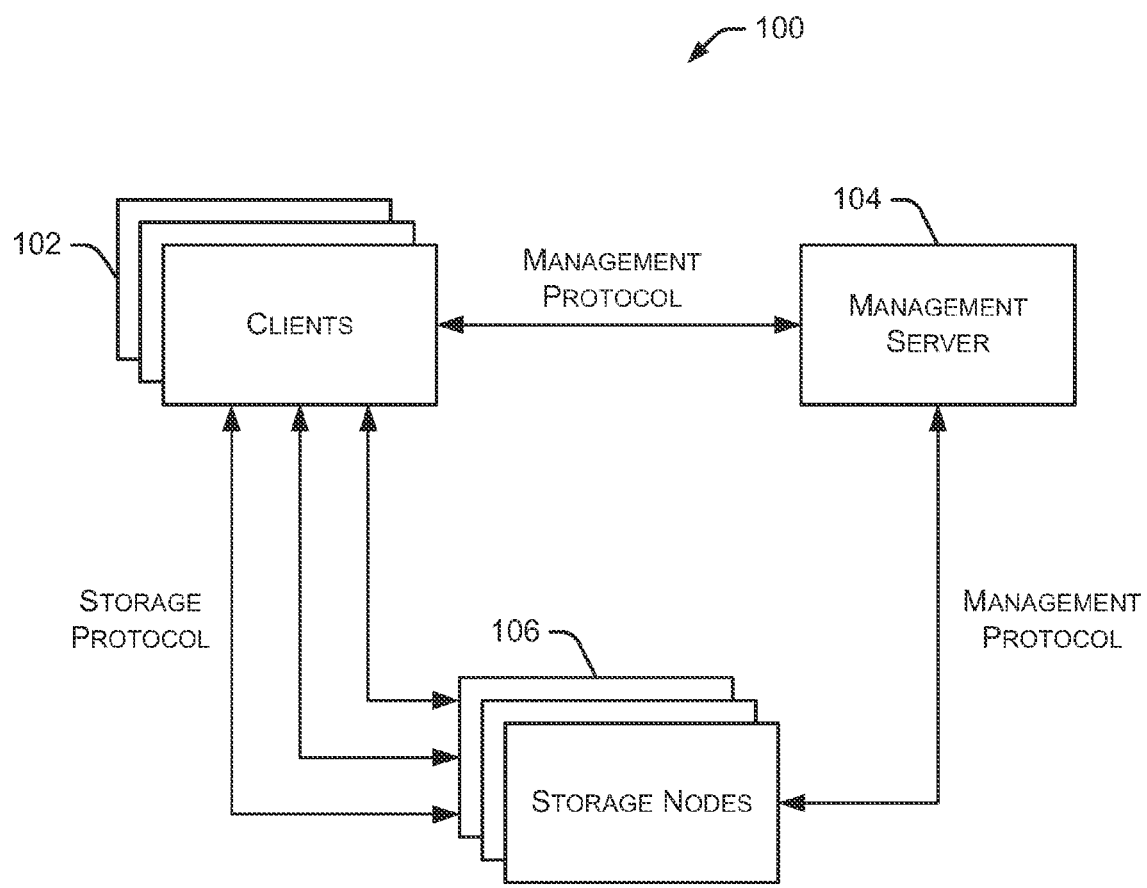
FIG. 1 is a block diagram depicting an environment within which an example embodiment may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide data consistency, reliability, and redundancy for a single client as well as multiple clients writing data to the same shared volume. The architecture described herein includes multiple storage nodes acting as one server and the data is distributed across those multiple storage nodes. The described implementation of distributed reservations (such as SCSI-3 reservations) solves the consistency problem of multiple clients with shared volumes. A reservation table exists on all storage nodes and is always in sync with other storage node reservation tables. The described systems and methods also solve the problem of reservation table inconsistency between the storage nodes by constantly checking for any issues based on a generation number.

Using the systems and methods described herein, clients can register themselves to one or more storage device servers and later can take reservations on the LUN (Logical Unit Number) to access the storage device for writes or reads. A persistent reservation table is maintained on the device server (also referred to as a management server) that contains the registrations and reservations as well as the type of access granted to the reservation holder. Clients can read/write the persistent reservation table using, for example, a SCSI3 Persistent Reservation protocol to read or update reservations. Typically, there are going to be multiple clients and a single storage server which provides the access to the reservation table.

In example embodiments, there are two protocols that take care of the data and the management of servers. Data is distributed across the storage nodes which provides data redundancy. The management server communicates with the storage nodes and the clients to update changes done to the environment and collect performance data. With the distribution of LUN data over multiple storage nodes and parallel access to that data, providing access to multiple clients presents a challenge. The challenge is that multiple clients need to access multiple data servers which store the distributed data. The distributed SCSI-3 persistent reservation protocol maintains a reservation table on all the storage nodes. The reservation table itself is not distributed, but all the storage nodes have the same reservation table providing high reliability and redundancy.

The distributed SCSI-3 persistent reservation protocol first tries to take a lock on all storage nodes and, if it is not successful, either gives up or tries again to get a lock. Once a lock is obtained, all the tables on storage nodes are checked for consistency of data based on an internal check. If the tables are not in sync between storage nodes, a sync up is performed among the storage nodes. Once the sync up is completed, SCSI-3 Persistent reservations are sent over the wire to all of the storage nodes. Based on the SCSI-3 Reserve IN or ReserveOUT commands, the table is either updated or a response is sent over to the client on all the nodes. In some embodiments, the reservations table is implemented on storage node using SQLite database. Although particular examples discussed herein utilize SCSI or SCSI-3, alternate embodiments may use any type of interface and any communication protocol.

SCSI-3 PR, which stands for Persistent Reservation, supports multiple nodes accessing a device while at the same time blocking access to other nodes. SCSI-3 PR reservations are persistent across SCSI bus resets or node reboots and also support multiple paths from host to disk/storage node. SCSI-3 PR uses a concept of registration and reservation. A ReserveIN command is associated with reading information from data servers regarding the reservations, and a ReserveOUT command is associated with writing information regarding locks to reservation databases on the storage devices. Additional details regarding SCSI-3 PR are provided herein.

FIG. 1 is a block diagram depicting an environment 100 within which an example embodiment may be implemented. As shown in FIG. 1, a management server 104 communicates with multiple clients 102 and multiple storage nodes 106 using a management protocol. Multiple clients 102 communicate with multiple storage nodes 106 using a storage protocol. The management protocol and storage protocol allow management server 104 to communicate with multiple clients 102 and multiple storage nodes 106 to perform the operations discussed herein. In particular, management server 104 performs various functions associated with retrieving data from storage nodes 106 and writing data to storage nodes 106. Additionally, management server 104 performs various functions associated with the operation of clients 102. In particular embodiments, management server 104 performs functions related to reserving storage nodes, locking access to storage nodes, assigning storage node access to particular hosts, and the like.

Figure 2:
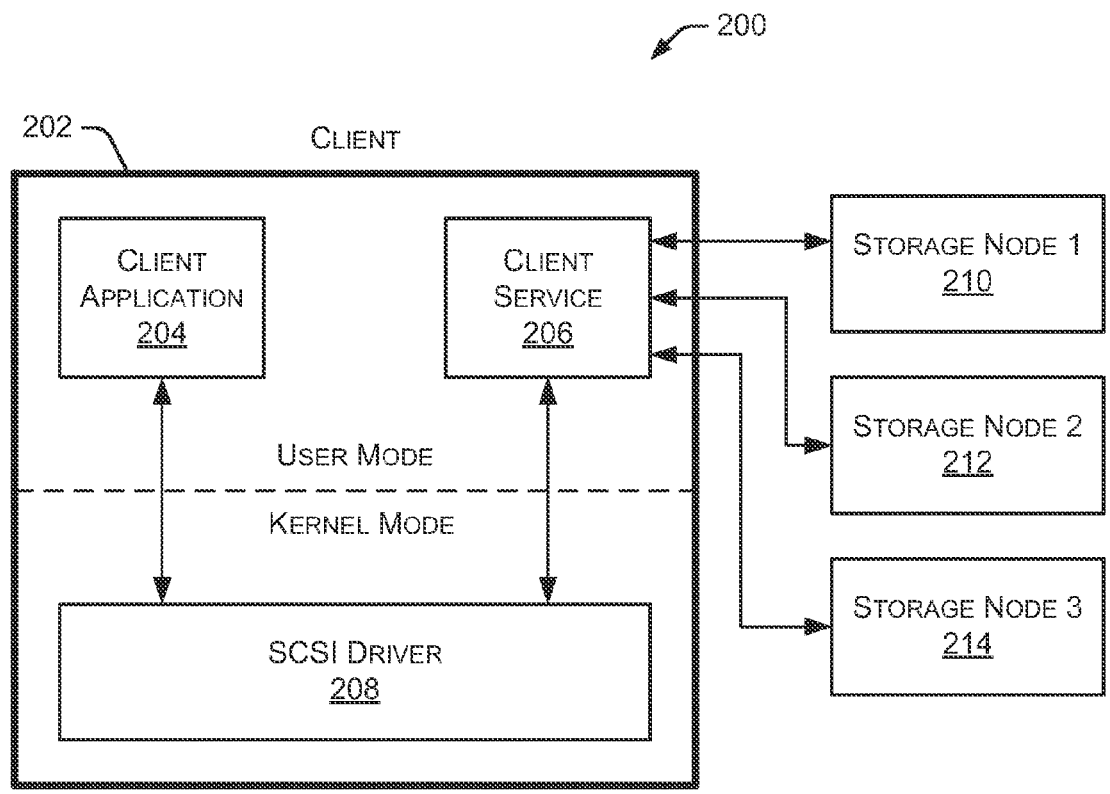
FIG. 2 is a block diagram depicting an embodiment of an example architecture to implement at least a portion of the distributed reservation systems and methods discussed herein.

FIG. 2 is a block diagram depicting an embodiment of an example architecture 200 to implement at least a portion of the distributed reservation systems and methods discussed herein. Client 202 shown in FIG. 2 includes one or more client applications 204 and one or more client services 206, which communicate with multiple storage nodes. Additionally, the client includes a SCSI driver 208. SCSI driver 208 is a kernel component that resides on the client system and provides a virtual SCSI disk device. SCSI driver 208 takes requests (e.g., data storage requests and data access requests) from client application 204, such as the File System, Cluster, or any other application that uses the file system or the block device, and wants to use the SCSI reservation framework. SCSI driver 208 converts and sends the requests to client service 206. SCSI driver 208 may support SCSI-3 as well as other SCSI versions. Client 202 is coupled to any number of storage nodes. In the example of FIG. 2, three storage nodes 210, 212, and 214 are coupled to client 202.

Figure 3:
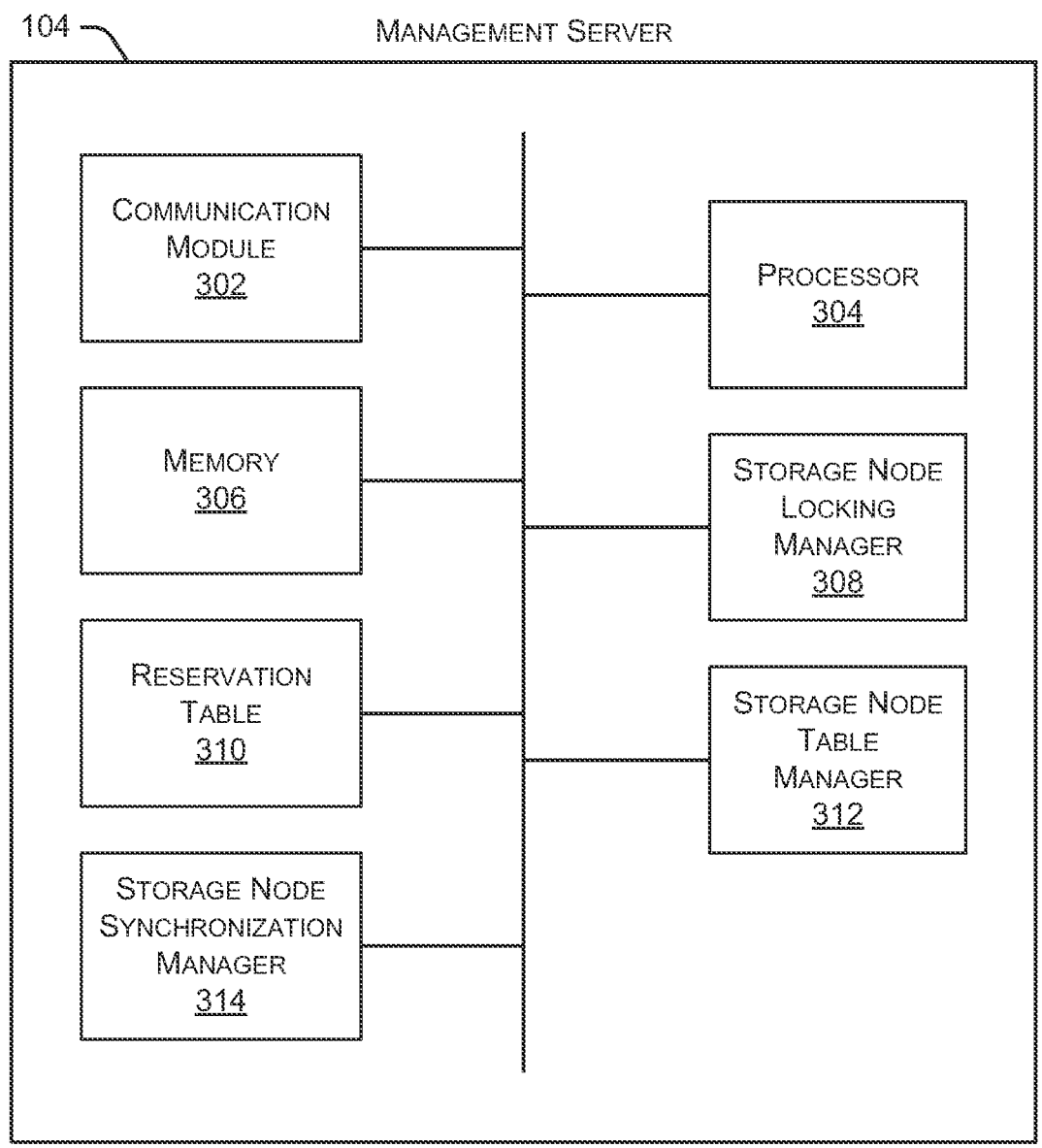
FIG. 3 is a block diagram depicting an embodiment of an example management server.

FIG. 3 is a block diagram depicting an embodiment of management server 104. As discussed herein, management server 104 performs various functions related to retrieving data from storage nodes and writing data to storage nodes. Management server 104 includes a communication module 302, a processor 304, and a memory 306. Communication module 302 allows management server 104 to communicate with other systems, such as communication networks, clients, storage nodes, other management servers, and the like. Processor 304 executes various instructions to implement the functionality provided by management server 104.

Memory 306 stores these instructions as well as other data used by processor 304 and other modules contained in management server 104.

Management server 104 also includes a storage node locking manager 308 that manages the locking of (or reservation of) one or more storage nodes as discussed herein. A reservation table 310 maintains a list of current reservations (e.g., the reservation of one or more storage nodes by one or more hosts). A storage node table manager 312 performs various functions to manage one or more tables contained in any number of storage nodes. Management server 104 also includes a storage node synchronization manager 314, which manages the synchronization of data between multiple storage nodes, as discussed herein.

Figure 4:
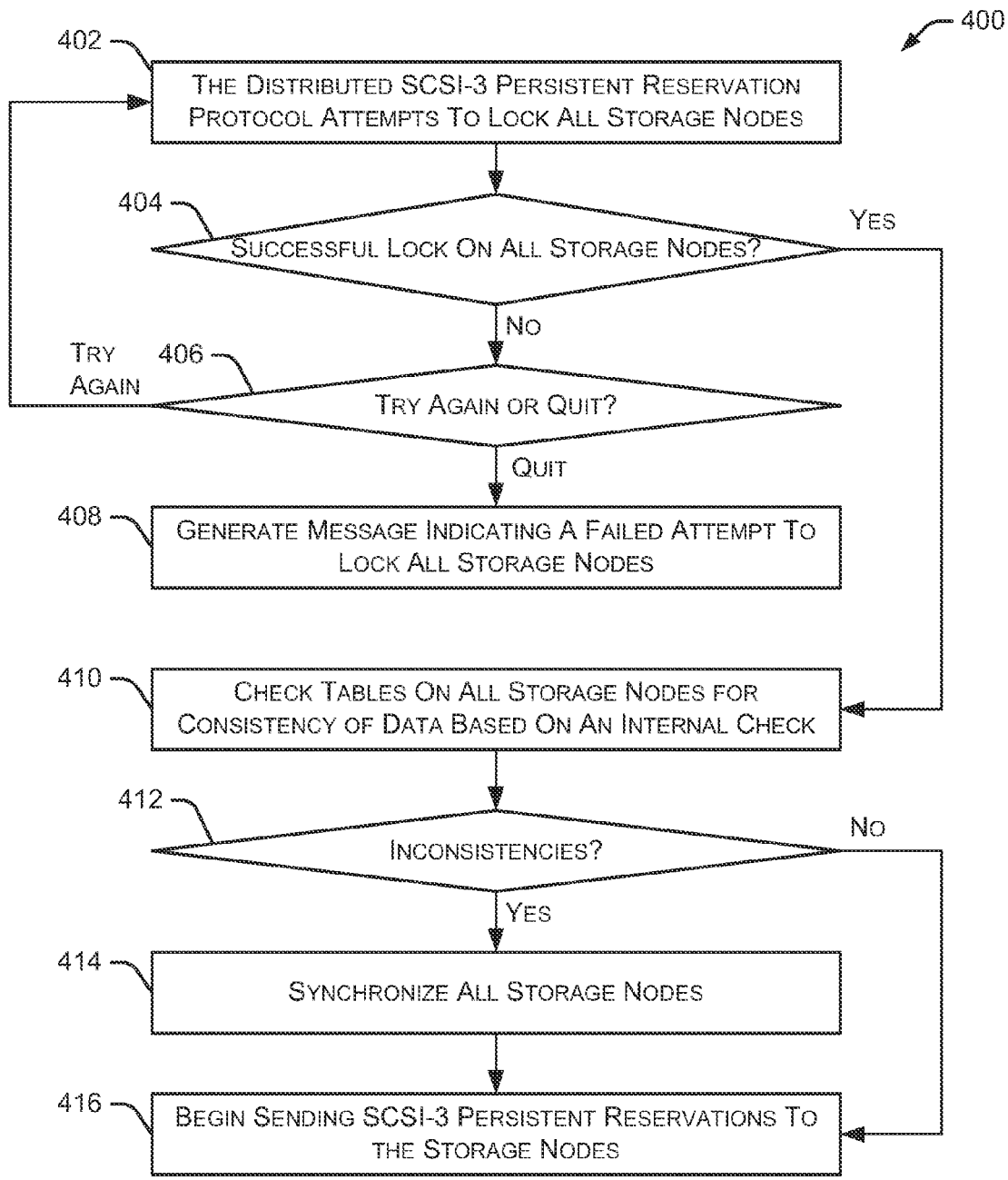
FIG. 4 is a flow diagram depicting an embodiment of a method for managing the access of data by a plurality of clients from a plurality of storage nodes.

FIG. 4 is a flow diagram depicting an embodiment of a method 400 for managing the access of data by a plurality of clients from a plurality of storage nodes. A distributed SCSI-3 persistent reservation protocol attempts to lock all storage nodes at 402. Method 400 determines whether all storage nodes were successfully locked at 404. If all storage nodes were not successfully locked (e.g., the attempted lock failed), method 400 determines whether to try to lock all storage nodes again or quit at 406. In some embodiments, method 400 knows, through a locking protocol, the number of connected storage nodes. If method 400 does not identify an equal number of locks, it may decide to try again. If method 400 decides to try again, the method returns to 402 and again attempts to lock all storage nodes. If all storage nodes were not successfully locked at 406, and method 400 does not try to lock the storage nodes again, a message is generated at 408 indicating a failed attempt to lock all storage nodes.

If all storage nodes are successfully locked at 406, method 400 checks the tables on all storage nodes for consistency of data based on an internal check at 410. In some embodiments, the internal check is performed by the client (or host) as part of the storage process. This checking of the storage node tables may identify inconsistencies between two or more storage nodes. If one or more inconsistencies are identified at 412, method 400 synchronizes all of the storage nodes at 414 to maintain consistency across all storage nodes. After all storage nodes are synchronized, the method 400 begins sending SCSI-3 persistent reservations to the storage nodes at 416.

In some embodiments, one or more storage nodes can get into a situation where a client or host can establish a lock on the distributed reservation tables on one or more storage nodes, but the client or host dies (e.g., fails to operate correctly, experiences a device failure or loses communication with one or more of the storage nodes). To resolve these situations, the systems and methods discussed herein may use a heartbeat thread (also referred to as a heartbeat signal) running on a host or a client. The heartbeat thread is started as soon as a lock is taken and continues until the ReserveOUT command is completed. In some embodiments, the heartbeat thread runs every few seconds and updates a timestamp on the locking table on each storage node. In particular implementations, the heartbeat thread is started by the client (or host) that initiated the lock of the multiple storage devices. The heartbeat thread is sent to each storage node connected to the client (or host).

While this heartbeat thread is running, another host (or client) cannot get a lock on the reservation tables in the storage nodes. If any storage node receives a lock request and the reservation table is already locked by another host (or client), the storage nodes compare the timestamp on the locking table and if the timestamp's last update time is more than certain time (e.g., 90 seconds), the system forcibly gives lock ownership to the new host. In this situation, the system presumes that the host (or client) that originally obtained the lock has failed or is no longer able to communicate with the storage nodes. Thus, the lock ownership is forcibly changed by the system to allow another host (or client) to lock the storage nodes. If the first host (i.e., the host that failed) later resumes active operation and sends a ReserveOUT request, the first host will receive a lock failure request and that host needs to send a new lock request again.

Example details for implementing the described systems and methods are provided below. The described systems and methods:

Conform to SCSI3 Specification spc3r23 for SCSI3 Reservation.

Support all the Commands needed by Windows Clustering Environment.

Support all the reservation-related commands that are needed by Windows Cluster Shared Volume (CSV).

Support all the Commands needed by Windows Hyper-V, Linux Storage, Stack, KVM, VMWare, any Unix storage stack, and other applications that use shared storage and use SCSI-3 Reservations for ownership decisions.

Distributed SCSI-3 Reservation Architecture

SCSI-3 PR, which stands for Persistent Reservation, supports multiple nodes accessing a device while at the same time blocking access to other nodes. SCSI-3 PR reservations are persistent across SCSI bus resets or node reboots and also support multiple paths from host to disk. SCSI-3 PR uses a concept of registration and reservation. Systems that participate, register a key with the SCSI-3 device. Each system registers its own key. Registered systems can then establish a reservation and write to the storage device blocking or sharing with other clients. In some embodiments, SCSI reservations are used by Windows host in a cluster, CSV, etc. environments to provide access to cluster nodes to write data to the storage device. Embodiments may use Windows Hyper-V, Linux SCSI storage stack, VMWare, KVM or any Unix variant storage stack that uses SCSI-3 reservations to share storage among hosts.

To solve the problem of multiple clients needing access to a shared volume spread across multiple storage nodes, the systems and methods implement the reservation as a two-step process. In the first step, the systems and methods take a lock on all current live storage nodes that are part of a shared volume that satisfy the redundancy requirements. In the second step, the systems and methods send the reservation request to each of the storage nodes and do a ReserveIN or ReserveOUT request. The reservation requests from the SCSI device are marshalled into the protocol to provide the redundancy and solving inconsistency issues among the storage nodes. Changes are done in the driver, the client, and on the server side to accommodate this design. To support SCSI3 persistent reservations, the systems and methods add new operations to an existing storage protocol.

SCSI Driver

The SCSI driver is modified to support the following SCSI3 persistent reservation commands:

SCSIOP_PERSISTENT_RESERVE_IN (0x5E)

SCSIOP_PERSISTENT_RESERVE_OUT (0x5F)

The SCSI Command Descriptor Block (CDB), and data buffer associated with the reservation commands, are sent to the user mode client service, which in turn sends them to the server nodes for further processing. The details of client side and server side changes are discussed herein.

Once the request is processed from the server, it sends the reply to the client which in turn sends the reply with the appropriate SCSI status and associated data buffer to the driver through an IOCtl. The driver completes the SCSI3 reservation request based on the SCSI status. The driver primarily acts as a pass-through component, which receives the requests from user mode applications and sends them to the Client side service, which has most of the intelligence about processing the request by communication with the server nodes.

Client Service

The client service gets the requests from the driver through an event mechanism. When the driver receives a command, it signals an event that the client service is waiting. After getting the signal, the client service pulls the request from the driver along with the associated data for that request. Once the client service has the request, it performs a series of operations, which involves locking the reservation tables on the server or syncing the database if the storage nodes are not in Sync, and once the lock has been taken, sending the ReserveIN or ReserveOUT command as requested by the driver. The following operations are introduced in the Client Server protocol to implement client changes for locking of the reservation table.

NDBL_FUNCTION_LCK_RSRV_TBL (LOCK)
NDBL_FUNCTION_LCK_RSRV_RDNT_TBL (RDNT_ LOCK)
NDBL_FUNCTION_LCK_RSRV_TBL_SYNC (SYNC)
NDBL_FUNCTION_LCK_RSRV_TBL_GIVEUP (GIVEUP)
NDBL_FUNCTION_LCK_RSRV_TBL_UNLCK (UNLOCK)

The following operations are introduced in the Client Server protocol to implement client changes for serving the ReserveIn and ReserveOut commands.

NDBL_FUNCTION_SCSI_RSRV_PIN (ReserveIN)
NDBL_FUNCTION_SCSI_RSRV_POUT (ReserveOUT)

Locking and Reservation Operation Design

A client wanting to send a SCSI ReserveIN/ReserveOUT command first needs to get a lock on the storage nodes. Each storage node has the exact copy of the table. Once the lock is obtained on the table on all storage nodes, the systems and methods send the SCSI commands IN/OUT to get reservation status or update the reservation table. A Generation ID is associated with the table that can tell if the table is the same or not on all the storage nodes. This is the sequence of calls which should be made prior to calling ReserveIN/ReserveOUT commands:

1. A client sends a NDBL_FUNCTION_LCK_RSRV_TBL request.
2. If the systems and methods get a lock on all storage nodes, the process continues. Check for the generation ID on all the storage nodes and if they are the same, proceed with ReserveIN/ReserveOUT command.
3. If the systems and methods don't get a lock on all storage nodes:
   a) If lesser than or equal to 50% ownership of locks (1 node in a set of 3 nodes), give up the reservation by sending GIVEUP.
   Wait for an arbitrary number of seconds and execute step 1.
   b) If more than 50% locks, wait for few milliseconds and send a RDNT_LOCK request.
   c) Now the systems and methods should have all the locks. If not, repeat step 3b.
   Take action after sometime if still don't own all locks. If the system receives consistent failures after several retries, send UNLOCK to all storage nodes and execute step 1 after waiting for an arbitrary number of milliseconds.
   d) Once the systems and methods have all locks, check for the consistency of Generation ID.
   If the Generation ID is not same, determine the correct generation ID and send a SYNC request to them. Server nodes can sync and respond to the request.
   e) Now the systems and methods have the lock and the tables are in Sync. The systems and methods are ready to send ReserveIN/ReserveOUT commands.
4. If the systems and methods get all locks on storage nodes, follow 3d.

Protocol Details

The following example uses a case of a three node storage grid.

NDBL_FUNCTION_LCK_RSRV_TBL

Case 1
1. Send this request to all nodes.
2. All nodes respond with a successful lock on the reservation table.

Case 2
1. Send this request to all nodes.
2. Only 2 out of 3 nodes respond.
3. Systems and methods still won majority of locks.
4. Other node who won the rest of the locks, would send a give up request.
5. After few milliseconds, send NDBL_FUNCTION_LCK_RSRV_RDNT_TBL request to all nodes.

Case 3
1. Send this request to all nodes.
2. Only 1 out of 3 nodes responded with success.
3. Lost out the competition.
4. Send a GIVEUP lock request to all nodes.
5. Lose locks on the ones it had before.
6. Wait for few seconds and resend the request again.

Once the systems and methods get the locks:
1. Check if the Generation ID is the same on all nodes.
2. If it's same, got a SUCCESSFUL Lock on all nodes.
3. Now send ReserveIN/ReserveOUT command.
4. If it's not same, decide which storage nodes has wrong GenID.
5. Send a SYNC request putting the correct GenID in the header.
6. Storage nodes on looking at the new GenID will know if their Reservation table is correct or not and take action.

NDBL_FUNCTION_LCK_RSRV_RDNT_TBL

This call is made when the systems and methods won the majority of nodes and still some nodes are locked by another Host. This should be sent giving enough time to nodes to give up their reservations.

1. Request sent to all nodes.
2. Storage nodes where the systems and methods do not have the locks should update the new owner of the table and respond with a Generation ID.

NDBL_FUNCTION_LCK_RSRV_TBL_GIVEUP

If the systems and methods did not get enough locks to proceed to call RSRV IN/OUT command, send this to all nodes. The storage nodes where the systems and methods are already the owners will clear the lock owned by the current systems and methods.

NDBL_FUNCTION_LCK_RSRV_TBL_SYNC

Once the current systems and methods are the owner of all the tables on storage nodes, check to see if the Generation ID's are the same. If they are the same, tables are the same, and the systems and methods are good to proceed. If they are not the same, decide which one is bad. Send the correct Generation ID to all nodes. For the storage node whose Generation ID doesn't match the one in the SYNC request, proceed to sync the table from other nodes which have the correct Generation ID. Storage nodes respond once the SYNC is done.

NDBL_FUNCTION_LCK_RSRV_PIN

This command deals with Persistent Reserve in command. Sub options which are supported under ReserveIN are:
1. READ KEYS
2. READ RESERVATION

NDBL_FUNCTION_LCK_RSRV_POUT

This command deals with Persistent Reserve out command. Sub options that are supported under ReserveOUT are:
1. REGISTER
2. RESERVE
3. RELEASE
4. CLEAR
5. PREEMPT
6. PREEMPT AND ABORT
7. REGISTER AND IGNORE EXISTING KEY
8. REGISTER AND MOVE
9. REPLACE LOST RESERVATION All the above commands in ReserveIN and ReserveOUT scope is the whole LUN. As part of the ReserveIN/OUT request, it includes a client id, generation id and other info which is sent to all the storage nodes. The storage nodes, depending on the information requests provided, execute the requests and put other state information and responds back.

Server Nodes

The server side has two major components:

Server Service: The server service which listens to the requests from the client and passes the requests to the SCSI 3 Reservation Library. The server fulfills all the requests for locking the reservation table, fulfilling the ReserveIN and ReserveOUT requests, and serving the read and write requests based on the current reservation state.

SCSI 3 Reservation Library: This is another core of the reservation process. It contains the database of current reservation and current locking state. It serves all the reservation requests conforming to the SCSI3 specification revision spc3r23

Figure 5:
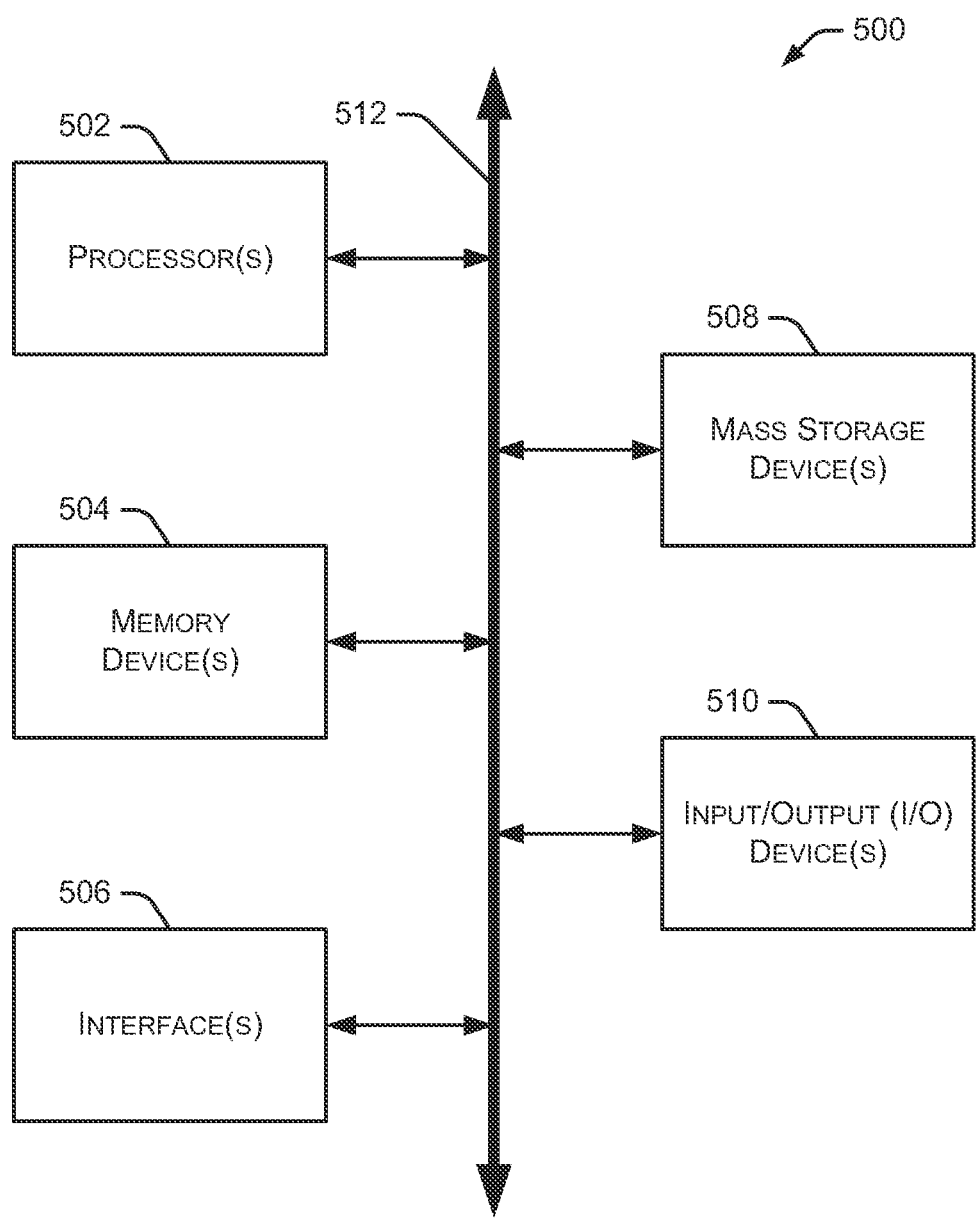
FIG. 5 is a block diagram depicting an example computing device.

FIG. 5 is a block diagram depicting an example computing device 500. Computing device 500 may interface, for example, with a VMBot as if it were another standard computing system. Further, standard computing devices, such as those depicted in FIG. 5, can be configured to hold one or more VMs for use as VMBots. Computing device 500 may be used to perform various procedures, such as those discussed herein. Computing device 500 can function as a server, a client or any other computing entity. Computing device 500 can be any of a wide variety of computing devices, such as a desktop computer, a notebook computer, a server computer, a handheld computer, a tablet, and the like.

Computing device 500 includes one or more processor(s) 502, one or more memory device(s) 504, one or more interface(s) 506, one or more mass storage device(s) 508, and one or more Input/Output (I/O) device(s) 510, all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM)) and/or nonvolatile memory (e.g., read-only memory (ROM)). Memory device(s) 504 may also include rewritable ROM, such as Flash memory.

Mass storage device(s) 508 include various computer readable media, such as magnetic tapes, magnetic disks, optical disks, solid state memory (e.g., Flash memory), and so forth. Various drives may also be included in mass storage device(s) 508 to enable reading from and/or writing to the various computer readable media. Mass storage device(s) 508 include removable media and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Interface(s) 506 include various interfaces that allow computing device 500 to interact with other systems, devices, or computing environments. Example interface(s) 506 include any number of different network interfaces, such as interfaces to local area networks (LANs), wide area networks (WANs), wireless networks, and the Internet.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   attempting to lock a plurality of reservation tables on each of a plurality of distributed storage nodes;
   responsive to successfully obtaining a lock on the plurality of reservation tables on each of the plurality of storage nodes:
   accessing the plurality of reservation tables in the plurality of storage nodes;
   analyzing the plurality of reservation tables to identify any data inconsistency across the plurality of storage nodes;
   responsive to identifying at least one data inconsistency on the plurality of reservation tables across the plurality of storage nodes, synchronizing the plurality of reservation tables on the plurality of storage nodes; and responsive to the reservation tables being consistent, sending SCSI-3 persistent reservations to each of the plurality of storage nodes.

2. The method of claim 1, further comprising:
determining whether a client that locked the plurality of storage nodes is active; and
responsive to determining that the client that locked the plurality of storage nodes is not active, updating a locking database in each of the plurality of storage nodes.

3. The method of claim 1, further comprising communicating a heartbeat thread from a client that locked the plurality of storage nodes to each of the plurality of storage nodes.

4. The method of claim 3, further comprising releasing the lock on the plurality of storage nodes if the heartbeat thread is not received for a particular time period.

5. The method of claim 1, further comprising releasing the lock on the plurality of storage nodes after a data retrieval or data storage operation is completed.

6. The method of claim 1, wherein the method is performed by a management server coupled to the plurality of storage nodes and coupled to a client that locked the plurality of storage nodes.

7. An apparatus comprising:
one or more processors;
memory operably connected to the one or more processors; and
the memory storing one or more modules programmed to:
attempt to lock a plurality of reservation tables on each of a plurality of distributed storage nodes;
responsive to successfully obtaining a lock on the plurality of reservation tables on each of the plurality of storage nodes:
access the plurality of reservation tables in the plurality of storage nodes;
analyze the plurality of reservation tables to identify any data inconsistency across the plurality of storage nodes;
responsive to identifying at least one data inconsistency on the plurality of reservation tables across the plurality of storage nodes, synchronize the plurality of storage nodes; and
responsive to the reservation tables being consistent, send SCSI-3 persistent reservations to each of the plurality of storage nodes.

8. The apparatus of claim 7, wherein the one or more modules are further programmed to:
determine whether a client that locked the plurality of storage nodes is active; and
responsive to determining that the client that locked the plurality of storage nodes is not active, update a locking database in each of the plurality of storage nodes.

9. The apparatus of claim 7, wherein the one or more modules are further programmed to communicate a heartbeat thread from a client that locked the plurality of storage nodes to each of the plurality of storage nodes.

10. The apparatus of claim 9, wherein the one or more modules are further programmed to release the lock on the plurality of storage nodes if the heartbeat thread is not received for a particular time period.

* * * * *